March 22, 1966 P. N. ECKLES 3,242,314
PORTABLE BRAZING AND WELDING DEVICE
Filed July 5, 1962 2 Sheets-Sheet 1

INVENTOR.
PAUL N. ECKLES
BY
ATTORNEY

March 22, 1966  P. N. ECKLES  3,242,314
PORTABLE BRAZING AND WELDING DEVICE
Filed July 5, 1962  2 Sheets-Sheet 2
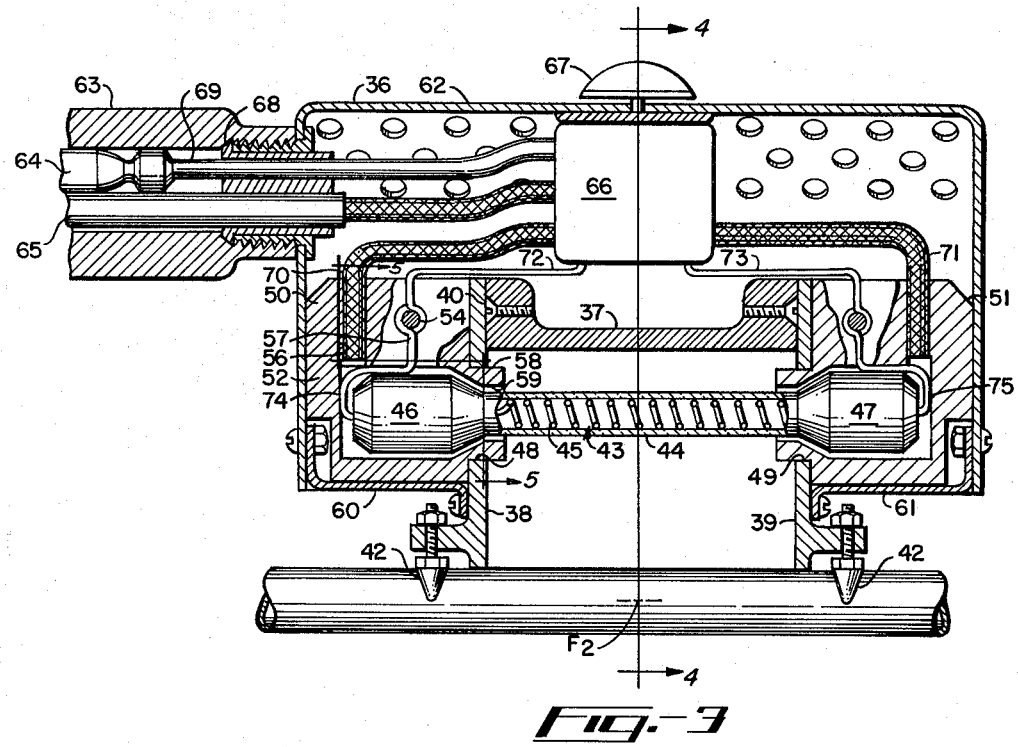
Fig.-3
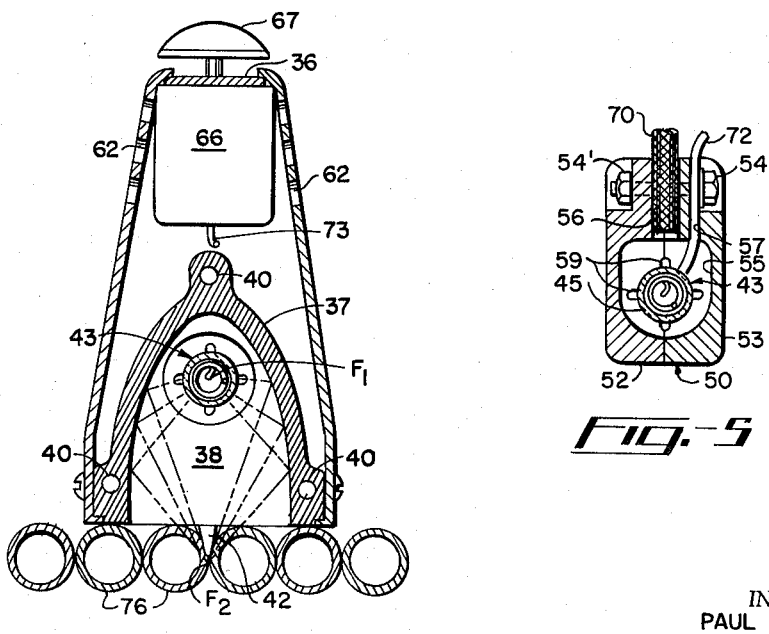
Fig.-4
Fig.-5
INVENTOR.
PAUL N. ECKLES
BY 
ATTORNEY

United States Patent Office 3,242,314
Patented Mar. 22, 1966

3,242,314
PORTABLE BRAZING AND WELDING DEVICE
Paul N. Eckles, Carmichael, Calif., assignor to Aerojet-General Corporation, Azusa, Calif., a corporation of California
Filed July 5, 1962, Ser. No. 207,487
2 Claims. (Cl. 219—347)

The present invention relates to a brazing and welding gun of novel construction enabling various operations to be carried out with ease and rapidity, which operations would be difficult and time consuming to carry out with brazing and welding equipment presently in use.

It is an object of the invention to provide a brazing and welding gun of small size and high efficiency capable of use in restricted locations although the novel features thereof may also be incorporated in fixed equipment for use in production line work.

A particular object of the invention is to provide a brazing and welding gun capable of producing an intense heat at a focal line or point by concentrating the heat of a heat source by optical means upon such focal line or point.

A further object of the invention is to provide a welding or brazing gun of simple construction which is comprised for the most part of readily obtainable parts and may be readily disassembled to replace parts subject to wear and reassembled with little loss of time.

Still further objects and features of the invention will hereinafter appear from the following description and accompanying illustrative drawings wherein;

FIGURE 3 is a partial longitudinal vertical section through a modification of the invention, which is adapted to provide a line weld or braze;

FIGURE 4 is a vertical section taken on the line 4—4 in FIGURE 3; and

FIGURE 5 is a detail section on the line 5—5 in FIGURE 3 showing the mounting block for the heating element.

Figures 1, 2:
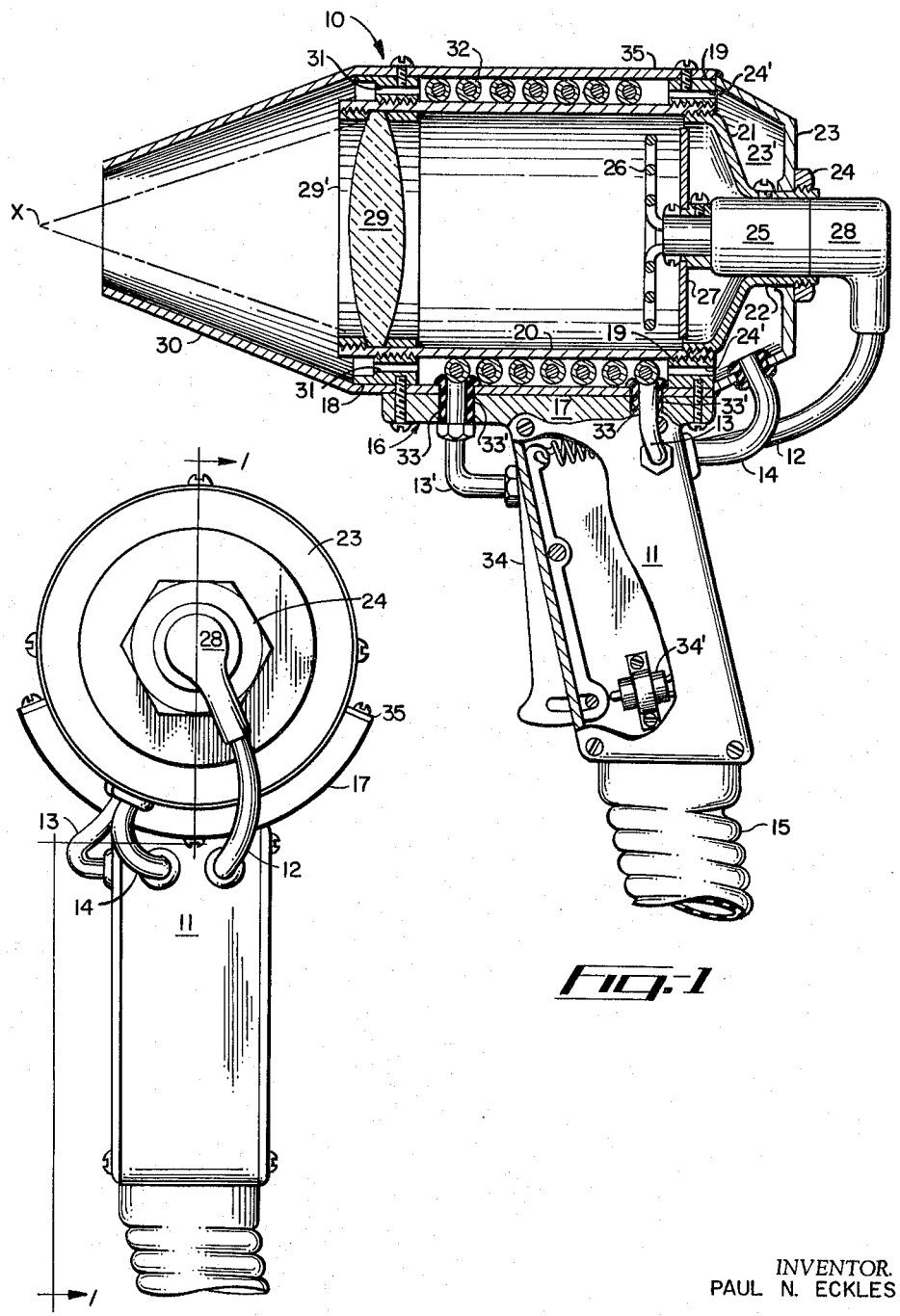
FIGURE 1 is a sectional view taken on line 1—1 of FIGURE 2 showing a brazing and welding gun embodying one form of the invention, which is adapted to provide a spot weld or braze.
FIGURE 2 is a rear elevational view of the gun shown in FIGURE 1.

Referring now to FIGURE 1 of the drawings the numeral 10 indicates generally a brazing or welding gun having a hollow pistol grip 11 to the butt of which an electrical power line 12, feed and return lines 13 and 13' for cooling water and a line 14 for supplying argon to the gun are attached. While argon is described as being used herein, any inert gas can be used for the function of purging the work area such as, for example, nitrogen and helium. Preferably the various lines are bundled together as shown at 15 adjacent the butt of the grip 11.

The gun assembly includes a stock 16 having a cradle 17 from which a front ring support 18 and a rear ring support 19 extend vertically. The heat projecting element of the gun is enclosed in a cylindrical housing 20, the rear end of which is provided with an annular threaded shoulder which is screwed into the interiorly threaded rear ring support 19. The rearward end of the housing 20 is closed by a screw threaded cap 21 having a central tubular extension 22. A cap 23 is pressed into gas-tight engagement with the rear surface of ring 19 by a threaded ring 24 and provides a manifold 23' for argon gas supplied from line 14. The argon gas will then pass through openings 24' in ring 19, about housing 20, and leave the housing at its forward end as will later appear.

An insulator plug 25 is fitted in tubular extension 22 and extends into the housing 20 and supports a tungsten heating element 26 at its inner end. A flat heat reflector 27 is mounted between heating element 26 and cap 21. Electrical leads (not shown) for the heating element 26 are arranged within plug 25 and are connected to terminals detachably engaged by contacts in a power plug 28.

The forward end of housing 20 is closed by a lens 29 mounted in a ring 29' screw threaded into the shell. The lens is bi-convex, bringing to a focus X all heat and light rays falling on it from the heating element 26 which are reflected by reflector 27 and, preferably, the lens is formed of a fused quartz. The forward end of the housing 20 is fitted with a conical heat and light shield 30 mounted on a forwardly projecting rim of the front ring support 18. The ring support 18 is also drilled with a series of openings 31 through which the argon gas from manifold 23' flows into the shield 30 to impinge upon the work being welded or brazed, and escapes into the atmosphere.

A helical cooling coil 32 through which water is circulated is arranged around the housing 20, the ends of the coil being passed through holes 33 drilled through the cradle 17. Grommets 33' render the holes 33 gas tight and the ends of the coil 32 are connected to the feed and return lines 13 and 13'. The portion of coil 32 extending above the upper edge of the cradle 17 is enclosed in a cover 35 secured by any suitable means to said upper edge and to the front and rear ring supports 18 and 19, respectively.

The pistol grip 11 of the gun is provided with a trigger 34 which actuates a two-stage microswitch 34' when the trigger is moved rearwardly. The switch 34' is designed so that during initial movement of the trigger, when the microswitch is in its first stage position, valves (not shown) in grip 11 are opened to permit flow of water from line 13 to the coil 32 and of argon through line 14 to manifold 23'. The argon will follow the spiral path of coil 32 to the forward end of the gun for a purpose which will later be explained. During further movement of the trigger 34, so that the microswitch is in its second stage position, a power circuit (not shown) is closed so that current will flow through the line 12 to the heating element 26.

In operation of the brazing or welding gun, the operator first places a small amount of braze alloy, for example, in the area desired to be treated, it being appreciated that that area may be virtually a pin point in size. He then focuses the braze gun on the pin point spot and actuates the trigger 34. This will initially cause the flow of water and argon through the gun, as explained above, the argon passing through the shield 30 to purge the area to be brazed. While the argon and water are both flowing, further movement of trigger 34 will permit the heating element 26 to be energized so that an instant, high heat will be applied through the lens 29 to the braze alloy which, upon melting, will heat the area sufficiently surrounding the pin point to permit brazing to occur. Release of the trigger 34 first cuts the heat source and for a short instant before termination of the flow of argon and water, the argon will protect the brazed alloy until it is cooled.

The embodiment of the invention illustrated in FIGURE 1 and 2 is specifically designed as a hand tool enabling a restricted area of a workpiece to be highly heated while flowing inert gas over the area. At the focus X, the temperature may be in the order of 3000° F., using a heavy tungsten filament as the heating element and adjusting the flow of current by an adjustable voltage transformer (preferably arranged to be portable). The gun shown in FIGURES 1 and 2 may also be arranged as a fixed installation and fitted with automatic controls for production line use. The hand gun is well adapted for use in carrying out operations such as repairs in restricted areas and to handle a wide variety of work. The handiness of the gun and the accuracy of application of the welding heat and of the duration of the heat enable the gun to be used in welding complex electrical assemblies, for instance, without danger of damage to delicate components.

Referring now to FIGURES 3 and 4, which show a modification adapted to provide a line weld or braze, the numeral 36 indicates an elongated main housing in which there is mounted a combined reflector and heating element housing 37. The reflector 37 is elliptical about one focal line $F_1$ extending longitudinally of the housing but terminates short of the second focal line $F_2$ on which the heat rays are concentrated. The line $F_2$ is therefore the line on the workpiece along which welding, brazing, and the like is effected.

The sides of the combined reflector and housing 37 are closed by plates 38 and 39 screwed to the reflector by machine screws 40. The open end of the reflector and lower edges of plates 38, 39 are finished to be in a common plane. A pair of line focus indicating and spacing pointers 42, are adjustably mounted on plates 38 and 39.

A heating element 43 is mounted coaxially of the focal line $F_1$ toward the inner end of the reflector 37 and is formed as a quartz tube 44 containing a helically wound tungsten filament 45 connected between metal end caps 46, 47 on the quartz tube, said end caps projecting through holes 48, 49 in the plates 38, 39.

Housing 36 is longer than reflector 37, providing spaces for split ceramic blocks 50 and 51 in which the ends of the heating element 43 are located. Since blocks 50 and 51 are identical, only block 50 will be specifically described.

As best seen in FIGURE 5, block 50 comprises two halves 52 and 53 held together by a bolt 54 and nut 54' to form a chamber 55 adapted to receive one end cap 46 of the heating element. A vertical passage 56 formed half in each half block communicates with the chamber 55. A hole 57 is also provided leading from under the head of bolt 54 into the chamber. A lateral collar 58 (FIGURE 3) formed on each half block extends into the hole 48 in the plate 38 with an easy fit therein, and a number of passages 59 are provided in the edge of the opening in the collar 58 through which the heating element extends.

The housing 36 is held in position relative to the plates 38, 39 and the blocks 50 and 51 are supported by angle members 60 and 61 extending from the housing ends under the blocks and to the side plates 38, 39. The sides of the housing are closed by apertured cover plates 62 having bent-over edge tabs secured to the housing and lower edge of the reflector 37 by any suitable means, not shown.

A tubular handle 63 is secured to the upper side of one end of the housing 36 and a hose 64 for argon gas and electric cable 65 are led through the handle and connected to a conventional timer and valve device 66 which is set by handle 67. Since the reflector 37 may be very hot, the inner end of the handle 63 is preferably closed off by a molded asbestos composition plug 68, the hose 64 being continued through the plug 68 as a metal tube 69 and the wires of the cable 65 are wound with asbestos tape. Argon flows from the hose 64 to the timer and valve device 66 and through branch tubes 70, 71 into the chambers 55 in the blocks 50 and 51 for cooling the end caps 46, 47 of the heating element and from the chambers into reflector 37 and out over the work. Electric power is led by leads 72, 73 from the timer 66 to be secured under the heads of bolts 54 which also secure the ends of pigtails 74, 75 passing through the holes 57 to the end caps of the heating element to which they are secured.

The timer and valve device 66 functions similarly to the two stage microswitch 34' and valves (not shown) employed in the embodiment of the invention shown in FIGURES 1 and 2. They are designed, when set by the operator, to first initiate the flow of argon into the cavity defined by the reflector 37 and onto the workpiece to purge the workpiece before electrical current is supplied to the heating element 43. The argon also serves the additional purpose of protecting the surface of reflector 37, which is preferably provided with a highly effective reflective surface.

The form of the gun shown in FIGURES 3, 4, and 5 is particularly designed to weld or braze rapidly along a line, for instance to cure leaks between tubes 76 attached in side by side relation as seen in FIGURE 4. It has been proven by use of this device that such work can be done in a fraction of the time required by other methods and devices previously available.

To operate the device, the gun is located over the workpiece, such as the tubes 76 which are in side by side relationship, and the indicating and spacing pointers 42 are adjusted so that the area desired to be heated is located at the focal line $F_2$ of the reflector. Thereafter, a braze alloy which may be powdered in form is poured along the joint between tubes 76. Then the voltage and duration of heating is determined and the timer properly set. As explained before, argon will flow first to purge the work area and will continue to flow while electrical current is supplied to the heating element 43, which produces a concentrated, intense heat along the focal line $F_2$ of the reflector. In a device constructed in accordance with the present invention, a .10" wide and 5.00" long braze was produced in about 45 seconds with an applied voltage of 240 volts and an argon flow of 40 cubic feet per hour. It can therefore be appreciated that this device produces a very fast heating of a work area. Yet, due to the concentration of heat, heat flow into areas adjacent to the brazed area, where deleterious effects might occur, is avoided.

Preferred embodiments of the invention have been described and illustrated by way of illustration but not as limitative of the invention, since changes and modifications of the described embodiments may be made by those skilled in the art without departing from the scope of the invention as set forth in the following claims.

I claim:
1. A device for directing heat onto a restricted area of a workpiece for accomplishing welding, brazing and the like operations, comprising:
   a housing having at least one open side;
   an elongated electrically energized source of radiant heat carried within the housing;
   a reflector mounted within the housing about the elongated source of radiant heat and of such geometry as to converge the radiant heat upon a line lying outside the housing;
   fluid conduit means connected to said housing including portions arranged in spaced enclosing relationship to each of the end portions of the elongated heat source so constructed and arranged as to direct a flow of gas over the enclosed end portions of the heat source and thence over the exposed intermediate portion of the heat source in a direction substantially parallel to the longitudinal axis thereof;
   electrical leads relating a source of electrical power to the source of radiant heat;
   fluid flow regulating means operatively interposed in the conduit means and carried by the housing;
   switch means operatively related to the electrical leads and carried by the housing; and
   unitary means for actuating the switch means and the flow regulating means in timed relation.
2. A device as in claim 1, in which the unitary actuating means includes means for sequentially actuating the flow regulating means and then the switch means to provide gas at the workpiece prior to directing radiant heat thereto and for terminating actuation of the switch means before that of the flow regulating means whereby a protective cover of inert gas is provided the heated portions of the workpiece during the initial cooling phase.

(References on following page)

References Cited by the Examiner

UNITED STATES PATENTS

| | | | |
|---|---|---|---|
| 2,221,318 | 11/1940 | Worthing et al. | 219—347 |
| 2,232,156 | 2/1941 | Abeles | 128—395 |
| 2,240,913 | 5/1941 | Roskos | 219—347 X |
| 2,364,730 | 12/1944 | Leskin | 219—227 |
| 2,399,033 | 4/1946 | Hudson | 200—61.86 |
| 2,439,083 | 4/1948 | French | 219—354 X |
| 2,632,087 | 3/1953 | D'Harlinque | 219—347 X |
| 2,861,166 | 11/1958 | Cargill | 219—347 X |
| 2,864,932 | 12/1958 | Forrer | 219—405 X |
| 3,008,029 | 11/1961 | Davis et al. | 219—347 X |
| 3,062,949 | 11/1962 | Lippart et al. | 219—125 |

FOREIGN PATENTS

| | | |
|---|---|---|
| 1,139,096 | 2/1957 | France. |
| 752,400 | 6/1953 | Germany. |
| 264,814 | 12/1927 | Great Britain. |
| 292,985 | 8/1929 | Great Britain. |
| 772,033 | 4/1957 | Great Britain. |

ANTHONY BARTIS, *Acting Primary Examiner.*